(12) United States Patent
Yahata et al.

(10) Patent No.: US 7,574,857 B2
(45) Date of Patent: Aug. 18, 2009

(54) EXHAUST EMISSION CONTROL SYSTEM FOR INTERNAL COMBUSTION ENGINE

(75) Inventors: Shigeto Yahata, Obu (JP); Kazuharu Tochikawa, Kariya (JP); Tsukasa Kuboshima, Okazaki (JP)

(73) Assignee: DENSO Corporation, Kariya (JP)

( * ) Notice: Subject to any disclaimer, the term of this patent is extended or adjusted under 35 U.S.C. 154(b) by 301 days.

(21) Appl. No.: 11/483,609

(22) Filed: Jul. 11, 2006

(65) Prior Publication Data

US 2007/0012034 A1  Jan. 18, 2007

(30) Foreign Application Priority Data

Jul. 12, 2005  (JP) .............................. 2005-203018

(51) Int. Cl.
*F01N 3/025*  (2006.01)

(52) U.S. Cl. .............................. 60/286; 60/295; 60/297; 60/311

(58) Field of Classification Search .................. 60/282, 60/291, 295, 297, 303, 286, 311
See application file for complete search history.

(56) References Cited

U.S. PATENT DOCUMENTS

| | | | |
|---|---|---|---|
| 4,897,096 A | 1/1990 | Pischinger et al. | |
| 5,265,418 A * | 11/1993 | Smith ........................... | 60/284 |
| 6,176,896 B1 | 1/2001 | Dementhon et al. | |
| 6,758,039 B2 | 7/2004 | Kuboshima et al. | |
| 6,817,174 B1 * | 11/2004 | Igarashi et al. ................. | 60/295 |
| 6,851,258 B2 * | 2/2005 | Kawashima et al. .......... | 60/311 |
| 6,854,265 B2 * | 2/2005 | Saito et al. ..................... | 60/295 |
| 6,910,329 B2 * | 6/2005 | Bunting et al. ................. | 60/297 |
| 6,966,178 B2 | 11/2005 | Saito et al. | |
| 7,159,384 B2 * | 1/2007 | Otake et al. .................... | 60/277 |
| 7,208,029 B2 * | 4/2007 | Shirakawa et al. ............. | 95/273 |
| 7,322,185 B2 * | 1/2008 | Koga et al. ..................... | 60/297 |
| 7,337,608 B2 * | 3/2008 | Gabe et al. ..................... | 60/286 |
| 7,343,738 B2 * | 3/2008 | Tsutsumoto et al. .......... | 60/295 |
| 2001/0052232 A1 * | 12/2001 | Hoffmann et al. ............. | 60/285 |

(Continued)

FOREIGN PATENT DOCUMENTS

JP    2002-309922    10/2002

(Continued)

OTHER PUBLICATIONS

Preliminary Search Report issued Feb. 9, 2009 in corresponding French Application No. 0606314000 and an at least Partial English language translation thereof.

*Primary Examiner*—Thomas E Denion
*Assistant Examiner*—Jonathan Matthias
(74) *Attorney, Agent, or Firm*—Nixon & Vanderhye P.C.

(57) ABSTRACT

In an exhaust emission control system for a vehicular internal combustion engine, a particulate filter collects particulate matters in an exhaust gas of the internal combustion engine. A filter regenerator regenerates the particulate filter by burning the particulate matters accumulated in the particulate filter. A filter front clogging detector determines whether a front end portion of the particulate filter is clogged by the particulate matters. A filter regeneration controller that controls the filter regenerator to perform a front regeneration to remove the particulate matters accumulated in the front end portion of the particulate filter when the filter front clogging detector determines that the front end portion of the particulate filter is clogged.

13 Claims, 6 Drawing Sheets

U.S. PATENT DOCUMENTS

| | | |
|---|---|---|
| 2003/0230078 A1 | 12/2003 | Yahata et al. |
| 2004/0035101 A1* | 2/2004 | Imai et al. .................... 60/295 |
| 2004/0123586 A1 | 7/2004 | Kuboshima et al. |
| 2004/0261401 A1* | 12/2004 | Ohkl et al. .................... 60/285 |
| 2005/0050884 A1* | 3/2005 | Nagaoka et al. ............... 60/295 |
| 2006/0130465 A1* | 6/2006 | Sun et al. ..................... 60/295 |
| 2007/0056274 A1* | 3/2007 | Wills ........................... 60/297 |
| 2008/0190098 A1* | 8/2008 | Colignon ...................... 60/295 |
| 2008/0196394 A1* | 8/2008 | Colignon ...................... 60/295 |

FOREIGN PATENT DOCUMENTS

| | | |
|---|---|---|
| JP | 2005-256713 | 9/2005 |
| WO | 2005/088088 A1 | 9/2005 |

* cited by examiner

NORMAL REGENERATION

CRANK ANGLE [DEG.]

FRONT END REGENERATION

CRANK ANGLE [DEG.]

EXHAUST EMISSION CONTROL SYSTEM FOR INTERNAL COMBUSTION ENGINE

CROSS REFERENCE TO RELATED APPLICATION

This application is based upon and claims the benefit of priority of Japanese Patent Application No. 2005-203018 filed on Jul. 12, 2005, the content of which is incorporated herein by reference.

FIELD OF THE INVENTION

The present invention relates to an exhaust emission control system for an internal combustion engine provided with a particulate filter for removing particulate matters contained in an exhaust gas of the engine, and, more particularly, the system that can regenerate the particulate filter.

BACKGROUND OF THE INVENTION

In recent diesel internal combustion engines mounted on vehicles, a particulate filter is installed on a way of an exhaust pipe to collect particulate matters so as to reduce the particulate matters contained in an exhaust gas.

The particulate filter is generally made of porous ceramics having a multiplicity of exhaust gas passages. When the exhaust gas passes through porous filter walls that partition the exhaust gas passages, the particulate matters are adsorbed and collected. If the particulate matters collected in the particulate filter keep accumulating in the particulate filter, a pressure loss in the particulate filter may increase and engine efficiency may decrease. Therefore, the particulate filter is regenerated by burning the particulate matters at adequate timings.

Specifically, the particulate filter supports an oxidation catalyst therein. In a regeneration of the particulate filter, a post fuel injection is performed after a main fuel injection to supply unburned HC (hydrocarbon) to the particulate filter. Then, an internal temperature of the particulate filter is increased by a catalysis of the unburned HC so as to burn and remove the particulate matters in the particulate filter (refer to US-2003-0230078-A1 and its counterpart JP-2004-019496-A, for example).

In an above-mentioned exhaust emission control system according to US-2003-0230078-A1 and its counterpart JP-2004-019496-A, HC is burned by the catalyst supported in the particulate filter in a normal regeneration of the particulate filter. Thus, as shown in FIG. 2, an exhaust gas temperature increases to a burning temperature of the particulate matters, to burn and remove the particulate matters in the particulate filter.

However, as shown in FIG. 2, in the normal regeneration of the particulate filter, the catalysis of the unburned HC, which is supplied by the post injection, does not occur enough in a front end portion of the particulate filter. Thus, the exhaust gas temperature does not increase enough to burn the particulate matters, so that some of the particulate matters accumulated in the front end portion remain unburned.

If this problem continues, a regeneration deficiency occurs in the front end portion of the particulate filter. Specifically, as shown in FIG. 3, the particulate matters accumulate in the front end portion to clog the exhaust gas passages in the particulate filter. The clogging can enlarge a pressure loss in the particulate filter and decrease an output power of the engine.

If a regeneration process is performed to the particulate filter in which the particulate matters are densely accumulated in the front end portion, the densely accumulated particulate matters can burn rapidly, to cause an excessively large temperature increase to damage the particulate filter.

SUMMARY OF THE INVENTION

The present invention is achieved in view of the above-described issues, and has an object to provide an exhaust emission control system for an internal combustion engine that can prevent malfunctions caused by the particulate matters accumulated in a front end portion of a particulate filter, specifically to provide the system that can prevent an output power decrease of the engine due to a pressure loss increase in the particulate filter, a breakage of the particulate filter due to an excessive temperature increase in regenerating the particulate filter, etc.

The exhaust emission control system includes a particulate filter, a filter regenerator, a filter front clogging detector and a filter regeneration controller. The particulate filter collects particulate matters in an exhaust gas of the internal combustion engine. The filter regenerator regenerates the particulate filter by burning the particulate matters accumulated in the particulate filter. The filter front clogging detector determines whether a front end portion of the particulate filter is clogged by the particulate matters. The filter regeneration controller controls the filter regenerator to perform a front regeneration to remove the particulate matters accumulated in the front end portion of the particulate filter when the filter front clogging detector determines that the front end portion of the particulate filter is clogged.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

First Embodiment

Figure 1:
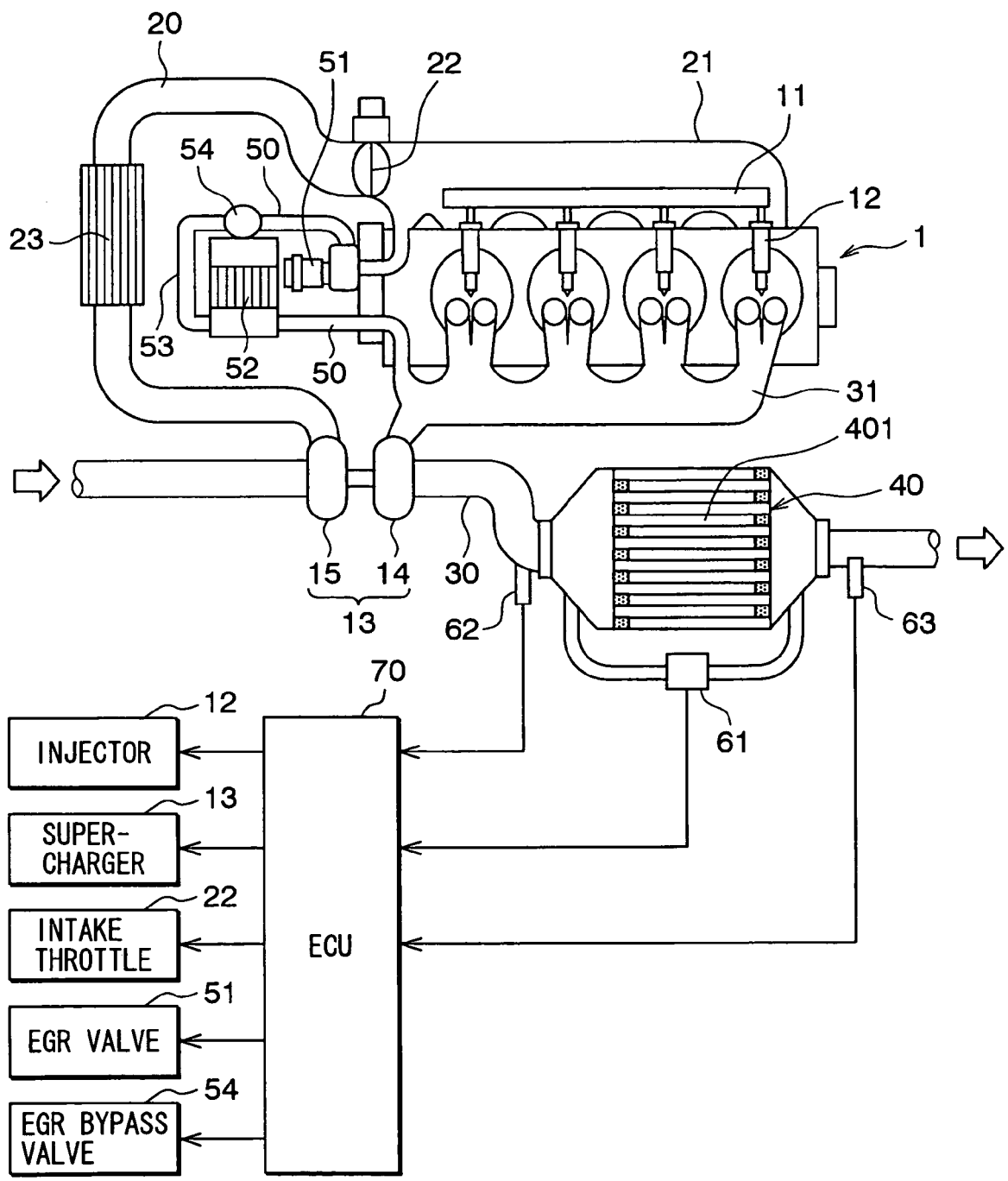
FIG. 1 is a schematic view showing an entire structure of an internal combustion engine having an exhaust emission control system according to a first embodiment of the present invention.

In the following is described an exhaust emission controls system according to a first embodiment of the present invention. FIG. 1 depicts an entire construction of an internal combustion engine (hereinafter referred to just as engine) 1 that is provided with the exhaust emission control system according to the first embodiment.

The engine 1 is a water-cooled diesel internal combustion engine that is mounted on a vehicle to drive the vehicle. The engine 1 includes a common rail 11 that accumulates high-pressure fuel therein, and a plurality of fuel injection valves 12 that are connected to the common rail 11 and inject the high-pressure fuel into cylinders of the engine 1. The engine 1 drives a pump (not shown) to pressurize a fuel into the high-pressure fuel and to pressure-supply the high-pressure fuel to the common rail 11. The common rail 11 and the fuel injection valve 12 form a fuel injection apparatus that is for injecting the fuel into the cylinders of the engine 1. The fuel injection apparatus corresponds to a filter regenerator according to the present invention.

An intake manifold 21 of the engine 1 is connected to an intake pipe 20. An intake throttle 22 is interposed between the intake pipe 20 and the intake manifold 21. The intake throttle 22 adjusts a passage area of an intake like so as to regulate an intake flow rate.

An exhaust manifold 31 of the engine 1 is connected to the exhaust pipe 30. A particulate filter 40 is installed on a way of the exhaust pipe 30 so as to collect particulate matters contained in an exhaust gas of the engine 1. The particulate filter 40 supports oxidation catalyst therein. The particulate filter 40 is made of heat-resistant ceramics such as cordierite and is formed in a shape of honeycomb. The honeycomb has an array of a multiplicity of exhaust passage cells 401 that are arranged side by side and partitioned by porous filter walls. An inlet side end or an outlet side end of each cell is blocked alternately. When the exhaust gas discharged from the engine 1 passes through the porous filter walls from one exhaust passage cell 401 to another, the particulate matters are trapped by the porous filter walls.

A turbine 14 of a centrifugal supercharger 13 is located upstream the particulate filter 40 in the exhaust pipe 30. A compressor 15 is located in the intake pipe 20. The turbine 14 is connected with the compressor 15 by a turbine shaft. Thereby, a thermal energy of the exhaust gas drives the turbine 14, and the compressor 15 via the turbine shaft, to compress an intake air, which is induced in the intake pipe 20, in the compressor 15. A supercharging pressure of the centrifugal supercharger 13 is adjusted by changing an angle of a nozzle (not shown) that is provided on a side of the compressor 15.

An intercooler 23 is located in the intake pipe 20 on a downstream side of the compressor 15 and on an upstream side of the intake throttle 22. The intake air, which is heated up when compressed in the compressor 15, is cooled by the intercooler 23.

The exhaust manifold 31 is connected to the intake manifold 21 via the EGR passage 50, so as to recirculate a part of the exhaust gas to an intake system of the engine 1 via the EGR passage 50. An EGR valve 51 is located at a connection between the EGR passage 50 and the intake manifold 21. The EGR valve 51 adjusts a passage area of the EGR passage 50 so as to regulate an amount of an exhaust gas recirculation amount (EGR amount) to be recirculated to the intake system of the engine 1.

On a way of the EGR passage 50 are located an EGR cooler 52 that is for cooling the recirculated exhaust gas, and an EGR bypass passage 53 that recirculates the exhaust gas to detour the EGR cooler 52. An EGR bypass valve 54 is located at a confluence point of the EGR cooler 52 and the EGR bypass passage 53 so as to switch the flow of the recirculated exhaust gas. That is, the EGR bypass valve 54 switches the recirculated exhaust gas between a flow through the EGR cooler 52 and a flow through the EGR bypass passage 53.

A pressure difference sensor 61 is located in the exhaust pipe 30. The pressure difference sensor 61 measures a difference between a pressure in an upstream portion of the particulate filter 40 and a pressure in a downstream portion of the particulate filter 40. One end of the pressure difference sensor 61 is connected to the exhaust pipe 30 on an upstream side of the particulate filter 40. The other end of the pressure difference sensor 61 is connected to the exhaust pipe 30 on a downstream side of the particulate filter 40. The pressure difference sensor 61 outputs an electric signal corresponding to the pressure difference between the upstream portion and the downstream portion of the particulate filter 40.

On an upstream side of the particulate filter 40 in the exhaust pipe 30 is installed a first exhaust gas temperature sensor 62 that outputs an electric signal corresponding to a temperature of the exhaust gas flowing into the particulate filter 40. On a downstream side of the particulate filter 40 in the exhaust pipe 30 is installed a second exhaust gas temperature sensor 63 that outputs an electric signal corresponding to a temperature of the exhaust gas passed through the particulate filter 40.

The ECU 70 includes a conventional microcomputer formed from a CPU, a ROM, a RAM, etc. (not shown), to perform calculation processes in accordance with a program stored in the microcomputer. The ECU 70 receives signals from the pressure difference sensor 61, the first exhaust gas temperature sensor 62 and the second exhaust gas temperature sensor 63. The ECU 70 receives signals from respective sensors (not shown) that detect an opening degree of the intake throttle 22, an opening degree of the EGR valve 51, a rotational speed of the engine 1, a velocity of the vehicle, an opening degree of an accelerator, a cooling water temperature, a crank position, a fuel pressure, and so on. The ECU 70 controls the fuel injection valve 12, the centrifugal supercharger 13, the intake throttle 22, the EGR valve 51, the EGR bypass valve 54, etc., in accordance with its calculation result.

In the following is described an action of the exhaust emission control system according to the first embodiment.

Figure 4A:
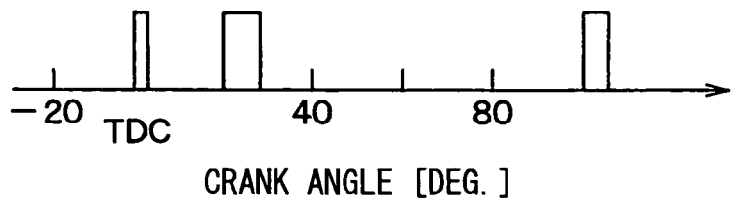
FIG. 4A is a diagram showing a fuel injection pattern in a normal regeneration by the exhaust emission control system according to the first embodiment.

When a whole PM (particulate matter) collection amount in a whole part of the particulate filter 40 becomes equal to or larger than a predetermined threshold value, which corresponds to the second threshold value according to the present invention, the exhaust emission control system performs a normal regeneration of the particulate filter 40 as the conventional exhaust emission control system does. FIG. 4A depicts a fuel injection pattern during the normal regeneration of the particulate filter 40, which includes: a main injection that is performed when the crank angle is approximately at a top dead center; and two post injections that are performed when the crank angle is approximately at 20° and 100°.

The fuel that is injected when the crank angle is approximately at 20° is burned in the cylinder so as to increase the temperature of the exhaust gas to be larger than an activation temperature of the catalyst that is supported in the particulate filter 40.

The fuel that is injected when the crank angle is approximately at 100° is not burnt in the cylinder, and flown as an unburned HC into the particulate filter 40. The unburned HC is burned by the catalyst supported in the particulate filter 40, so that the temperature of the exhaust gas increases enough to burn the particulate matters. Thus, the particulate matters in the particulate filter 40 are burned to be removed, to recover a PM collection performance of the particulate filter 40.

Figure 3:
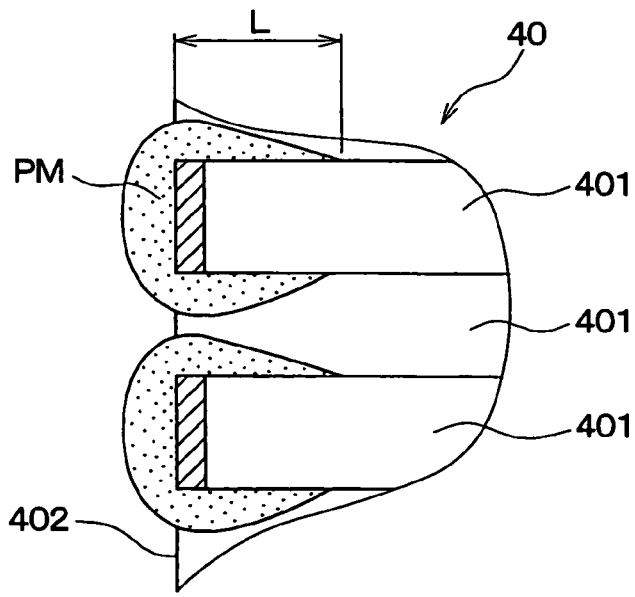
FIG. 3 is an enlarged view showing an accumulation state of particulate matters in a front end portion of the particulate filter of the exhaust emission control system according to the first embodiment.

However, when the normal regeneration of the particulate filter 40 is performed with the post injections as described above, the unburned HC does not react enough in a front end portion of the particulate filter 40, and the temperature of the exhaust gas does not increase enough in the front end portion of the particulate filter 40. Thus, a regeneration deficiency occurs in the front end portion of the particulate filter 40, to accumulate the particulate matters in the front end portion of the particulate filter 40 as shown in FIG. 3 and to clog the exhaust passage 401 of the particulate filter 40. The exhaust emission control system according to the first embodiment is configured to perform the regeneration of the front end portion of the particulate filter 40 securely when the front end portion is clogged. In the following is described a procedure of the regeneration of the front end portion of the particulate filter 40 in detail.

In this regard, the front end portion of the particulate filter 40 according to the present invention corresponds to an upstream end surface 402 of the particulate filter 40 and a range L of approximately 10 mm or smaller, for example, in the exhaust passage 401 of the particulate filter 40 extending from the upstream end surface 402 as shown in FIG. 3.

Figure 5:
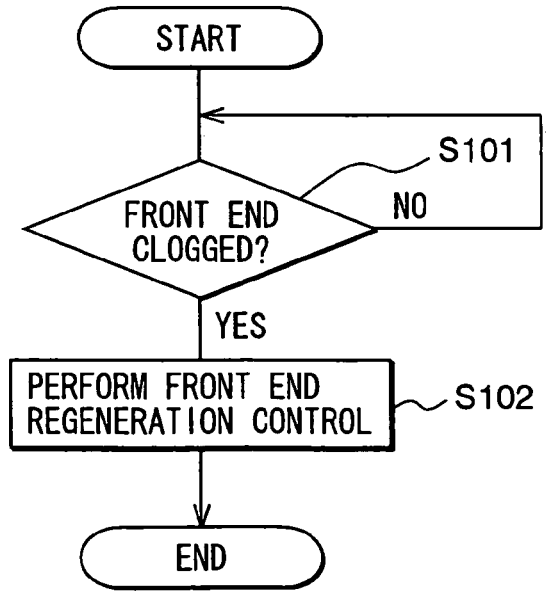
FIG. 5 is a flowchart showing a front end portion regeneration control process by the exhaust emission control system according to the first embodiment.

FIG. 5 is a flowchart showing a regeneration control process by the ECU 70 to regenerate the front end portion of the particulate filter 40. Firstly, the ECU 70 determines whether the front end portion of the particulate filter 40 is clogged by the accumulated particulate matters in a step S101. Specifically, the ECU 70 determines that the front end portion of the particulate filter 40 is clogged when a PM (particulate matter) amount (g/L) currently accumulated in the front end portion of the particulate filter 40 becomes equal to or larger than a front end clogging determination threshold value at a time point f in FIG. 6. The front end clogging determination threshold value corresponds to the first threshold value according to the present invention. The PM amount accumulated in the front end portion of the particulate filter 40 is referred to as a front end PM accumulation amount in the following. If the ECU 70 determines that the front end portion of the particulate filter 40 is not clogged in the step S101, the ECU 70 repeats the determination of the step S101. The process of the step S101 by the ECU 70 corresponds to the clogging determination means according to the present invention.

Figure 7:
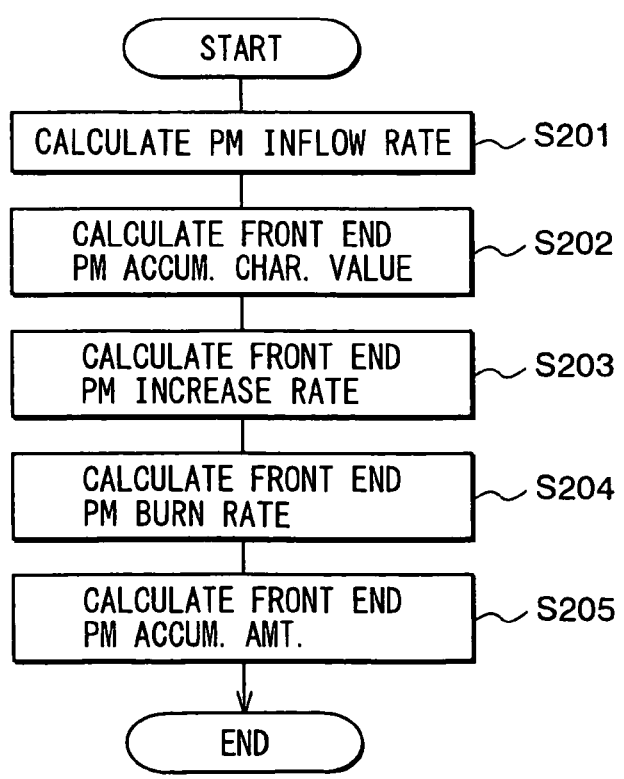
FIG. 7 is a flowchart showing a particulate matter increase rate calculation process by the exhaust emission control system according to the first embodiment.

The front end PM accumulation amount is calculated as follows. FIG. 7 is a flowchart showing a front end PM accumulation amount calculation process by the ECU 70. Firstly, in a step S201, the ECU 70 calculates a PM inflow speed (g/sec), which is a PM amount that flows into the particulate filter 40 in a unit time.

The PM inflow speed is determined as follows. For example, a correlation of the PM inflow speed and the rotational speed and the fuel injection amount of the engine 1 is investigated beforehand by bench-tests and the like, and stores a map of the correlation in the ECU 70. Then, the ECU 70 determines the PM inflow speed based on the current rotational speed and the fuel injection amount of the internal combustion engine 1, by referring to the map.

The PM inflow speed can also be determined with a pressure difference between the pressure in the upstream portion of the particulate filter 40 and the pressure in the downstream portion of the particulate filter 40, which is detected by the pressure difference sensor 61, and a volume of an exhaust gas flow rate. That is, the pressure difference increases in accordance with an increase of the PM collection amount at a certain exhaust gas flow rate. The increase of the PM collection amount is approximately proportional to the PM inflow speed. The PM inflow speed can be determined also by using this correlation.

Next, in a step S202, the ECU 70 calculates a front end PM collection characteristic value, which is a ratio of the PM accumulated in the front end portion of the particulate filter 40 of a whole amount of the particulate matters flown into the particulate filter 40.

Figure 8:
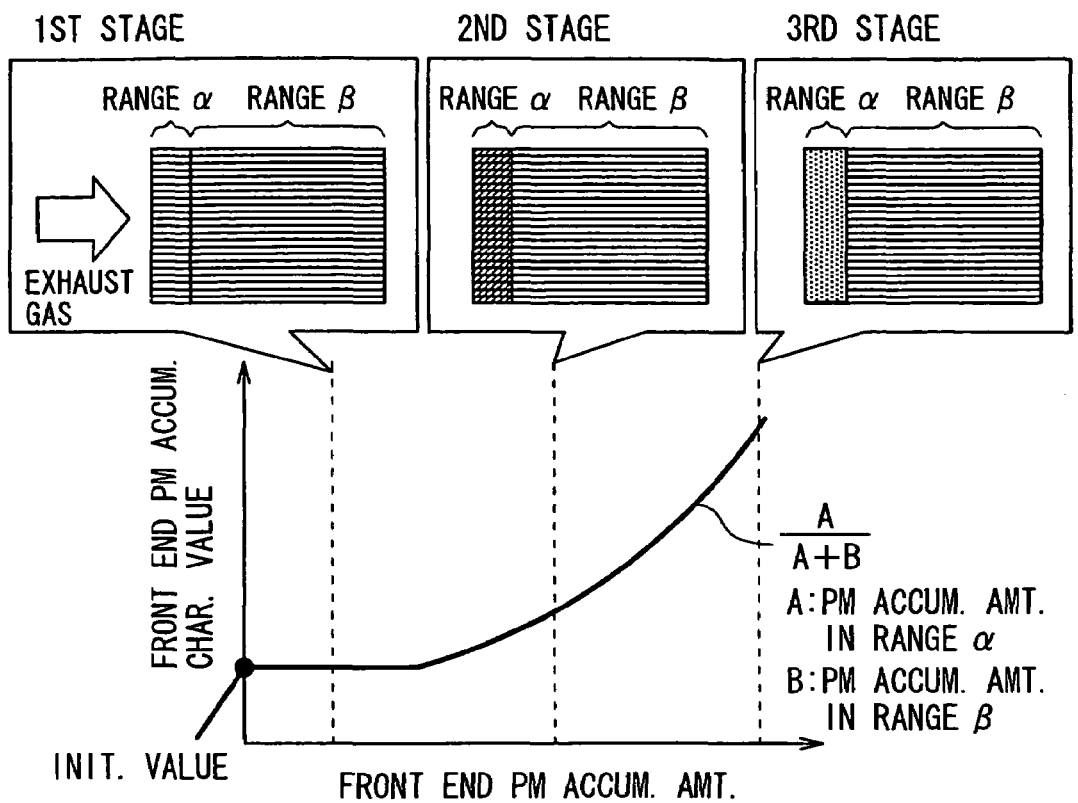
FIG. 8 is a diagram showing a particulate matter accumulation characteristic value in the front end portion of the exhaust emission control system relative to a particulate matter accumulation amount in the front end portion of the exhaust emission control system according to the first embodiment.

The front end PM collection characteristic value is calculated in accordance with the front end PM accumulation amount, based on a front end portion PM accumulation characteristic that is shown in FIG. 8 and stored beforehand in the ECU 70. The front end PM accumulation amount used in the calculation in the step S202 is a last calculated value of the front end PM accumulation amount that is calculated in a S205 last time.

With regard to the front end portion PM accumulation characteristic, the front end PM collection characteristic value is defined as A/(A+B), in which A denotes a PM amount accumulated in a range α, which is a range in the front end portion of the particulate filter 40, and B denotes a PM amount accumulated in a range β, which is a range except the range α in the particulate filter 40. In a first stage in FIG. 8 in which the front end PM accumulation amount is relatively small, the particulate matters are accumulated approximately uniformly over an entire length of the particulate filter 40 from the range α to the range β. Thus, the front end PM collection characteristic value is approximately equal to an initial value of the front end PM collection characteristic value when no particulate matter is accumulated in the particulate filter 40. In this regard, the initial value of the front end PM collection characteristic value is approximately equal to a ratio of the filtration area in the range α to an entire filtration area of the range α and the range β of the particulate filter 40. In a second stage or in a third stage in FIG. 8, in which the front end PM accumulation amount is relatively large, the PM accumulated much in the range α hinders a passage of a new inflow of the particulate matter. Thus, the front end PM collection characteristic value becomes large.

Then, in a step S203, the ECU 70 calculates a front end portion PM increase rate (g/sec), which is a PM amount accumulated in the front end portion of the particulate filter 40 in a unit time, by a multiplication of the PM inflow speed, which is determined in the step S201, and the front end PM collection characteristic value, which is determined in the step S202.

Next, in a step S204, the ECU 70 calculates a front end portion PM burn rate, based on an inflow gas temperature and the last value of the front end PM accumulation amount. Here, the inflow gas temperature is a temperature of the exhaust gas flowing into the particulate filter 40 and detected by the first exhaust gas temperature sensor 62. Further, the front end portion PM burn rate is a PM amount (g/sec) that is accumulated in the front end portion of the particulate filter and burned in a unit time.

Figure 9:
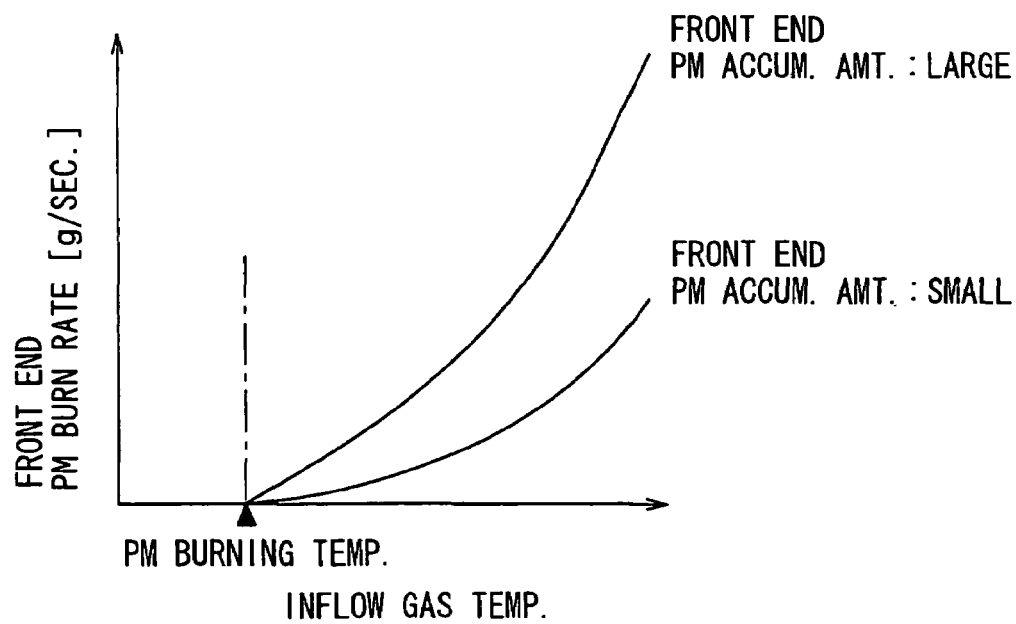
FIG. 9 is a diagram showing a particulate matter burn rate in the front end portion of the particulate filter relative to an inflow gas temperature in the exhaust emission control system according to the first embodiment.

As shown in FIG. 9, the front end portion PM burn rate increases as the inflow gas temperature becomes large, and as the front end PM accumulation amount becomes large. The ECU 70 stores a characteristic diagram shown in FIG. 9, and calculates the front end portion PM burn rate based on the inflow gas temperature and the last value of the front end PM accumulation amount.

Next, in the step S205, the ECU 70 calculates the front end PM accumulation amount based on the front end portion PM increase rate, which is determined in the step S203, and the front end portion PM burn rate, which is determined in the step S204.

Specifically, a front end total PM accumulation amount, which is a total PM amount accumulated in the front end portion of the particulate filter 40 after the last front end portion regeneration, is calculated by an integration of the front end portion PM increase rate. A front end total PM burning amount, which is a total PM amount that is burned in the front end portion after the last front end portion regeneration, is calculated by subtracting the front end total PM burning amount from the front end total PM accumulation amount after calculating the front end portion PM burn rate by the integration.

In the step S101 in FIG. 5, if the ECU 70 determines that the front end portion of the particulate filter 40 is clogged, the process goes to a step S102. In the step S102, the ECU 70 controls the filter regenerator to perform an operation to suitable for removing the particulate matters accumulated in the front end portion of the particulate filter 40, so as to remove the clogging in the front end portion of the particulate filter 40, that is, to regenerate the front end portion of the particulate filter 40. The process in the step S102 by the ECU 70 corresponds to the clogging removal means according to the present invention.

Figure 4B:
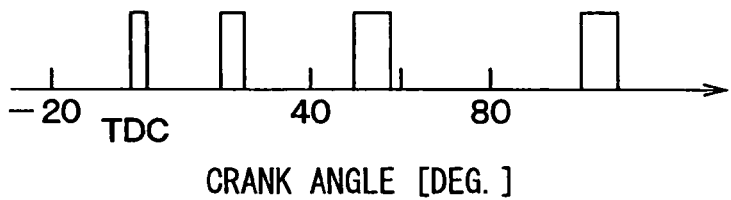
FIG. 4B is a diagram showing a fuel injection pattern in a front end portion regeneration by the exhaust emission control system according to the first embodiment.

FIG. 4B depicts a fuel injection pattern during the front end portion regeneration of the particulate filter 40. In the step S102, the ECU 70 controls the operation of the fuel injection valve 12 to perform the fuel injection pattern shown in FIG. 4B.

In the front end portion regeneration time, after the main injection when the crank is in the proximity of the top dead center, three post injections are performed when the crank is in the proximity of 20°, 50°, and 100°. That is, the fuel injection pattern in the front end portion regeneration time includes a post injection when the crank is in the proximity of 50° in addition to the fuel injection pattern in the normal regeneration time.

Figure 2:
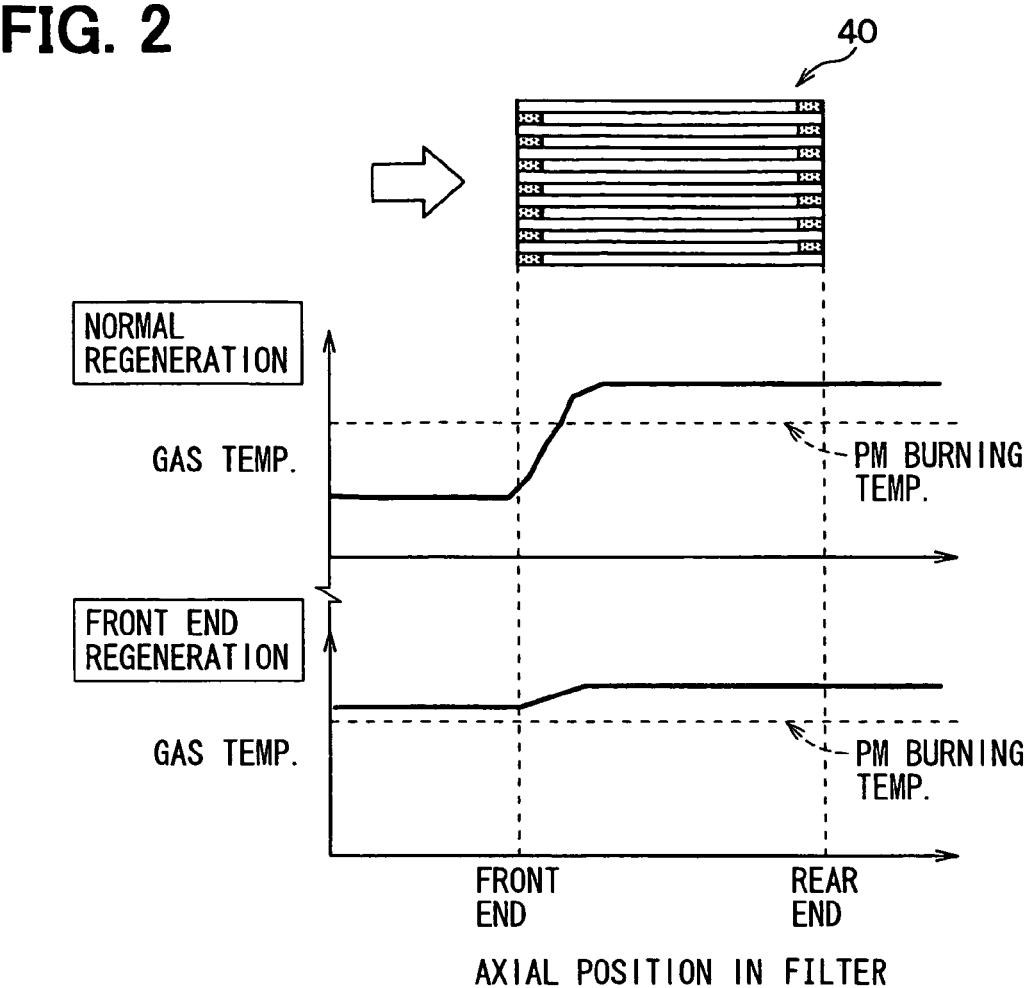
FIG. 2 is a diagram showing a temperature distribution characteristic of an exhaust gas along an axial direction of a particulate filter of the exhaust emission control system according to the first embodiment.

By continuing the combustion in the cylinder when the crank is in the proximity of 50°, the fuel for the post injection when the crank is in the proximity of 100° can be ignited and burned in the cylinder. That is, the post injection when the crank is in the proximity of 50° serves to increase the exhaust gas temperature. Accordingly, as shown in FIG. 2, when the exhaust gas flows into the particulate filter 40, the inflow gas temperature is larger than the PM burning temperature. Thus, the particulate matters in the front end portion of the particulate filter 40 is burned and removed, to resolve the clogging in the front end portion of the particulate filter 40.

Figure 6:
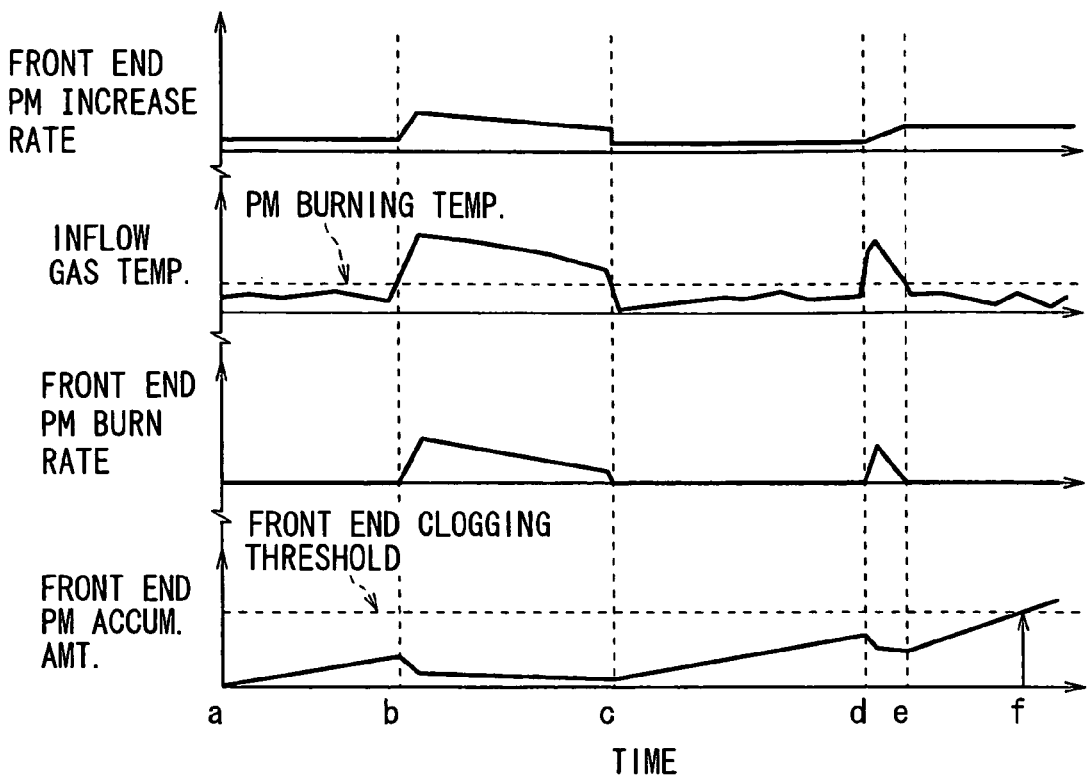
FIG. 6 is a timing chart showing a threshold for determining a particulate matter clogging in the front end portion of the particulate filter of the exhaust emission control system according to the first embodiment.

In the following is described a procedure to determine that the front end portion of the particulate filter 40 is clogged, based on an example shown in FIG. 6. The inflow gas temperature is smaller than a PM burning temperature between a time point a and a time point b, between a time point c and a time point d, and after a time point e in FIG. 6. Thus, the particulate matters in the front end portion of the particulate filter 40 are not burned, to increase the front end PM accumulation amount. Between the time point b and the time point c, and between the time point d and the time point e, the inflow gas temperature is larger than the PM burning temperature. Thus, the particulate matters in the front end portion of the particulate filter 40 are burned, to decrease the front end PM accumulation amount. When the front end PM accumulation amount becomes equal to or larger than the front end clogging determination threshold value (first threshold value) in the time point f, the ECU 70 determines that the front end portion of the particulate filter 40 is clogged.

Second Embodiment

In the first embodiment, the ECU 70 determines that the front end portion of the particulate filter 40 is clogged in the step S101 in FIG. 5 when the front end PM accumulation amount becomes equal to or larger than the front end clogging determination threshold value. In the second embodiment, the ECU 70 determines that the front end portion of the particulate filter 40 is clogged in another way.

Figure 10:
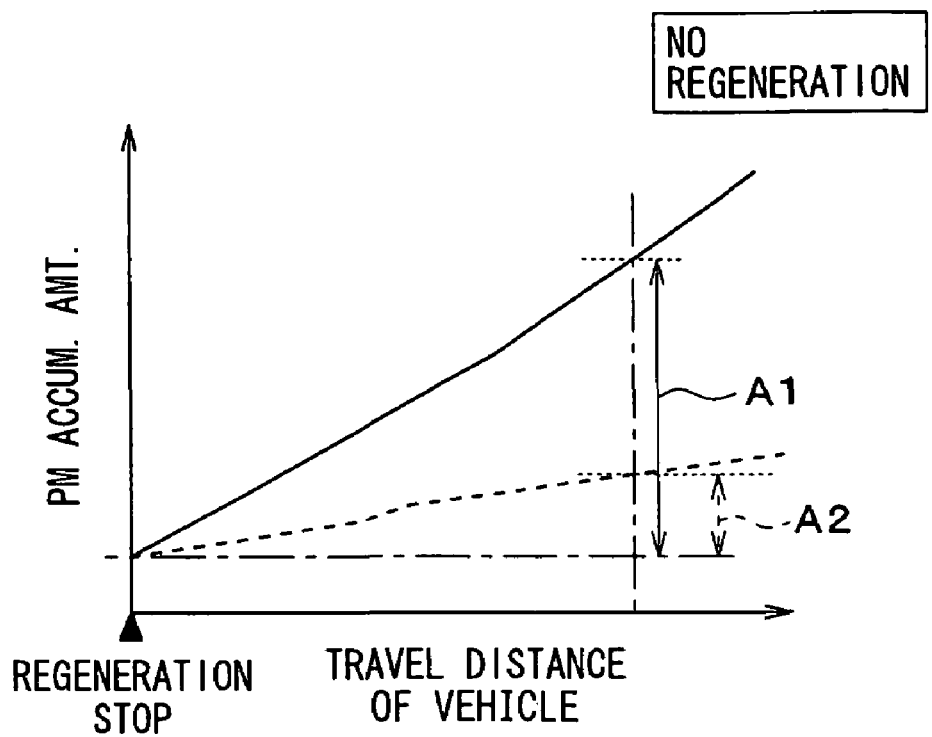
FIG. 10 is a diagram showing an estimated particulate matter increase amount in a non-regeneration time by an exhaust emission control system according to a second embodiment of the present invention.

FIG. 10 depicts an estimated PM accumulation amount that is accumulated in the particulate filter 40 in a non-generation time when neither the normal regeneration nor the front end portion regeneration is performed. In the drawing, a solid line indicates a first estimated PM accumulation amount, which is the PM accumulation amount in the particulate filter 40 that is estimated from the pressure difference detected by the pressure difference sensor 61 between the front portion and rear portion of the particulate filter 40. A broken line indicates a second estimated PM accumulation amount, which is the PM accumulation amount in the particulate filter 40 that is estimated from the driving state of the internal combustion engine 1 and the temperature in the particulate filter 40.

The second estimated PM accumulation amount is determined as follows. Firstly, a correlation between the PM increase rate in a while portion of the particulate filter 40 and the rotational speed and the fuel injection amount of the engine 1 is investigated beforehand by bench-tests and the like, and stores a map of the correlation in the ECU 70. Then, the ECU 70 determines the PM increase rate in the while portion of the particulate filter 40 based on the current rotational speed and the fuel injection amount of the internal combustion engine 1, by referring to the map.

The higher the internal temperature of the particulate filter 40 is, the larger the PM burn rate is in the whole body of particulate filter 40. The ECU 70 also memorizes a characteristic curve of this correlation between the internal temperature of the particulate filter 40 and the PM burn rate in the whole body of the particulate filter 40, and determines the PM burn rate in the whole body of the particulate filter 40 based on the internal temperature of the particulate filter 40, referring to the characteristic curve. The internal temperature of the particulate filter 40 is estimated with: the exhaust gas temperature that is detected by the first exhaust gas temperature sensor 62 before the exhaust gas flows into the particulate filter 40; and the exhaust gas temperature that is detected by the second exhaust gas temperature sensor 63 after the exhaust gas passed through the particulate filter 40.

The total PM accumulation amount, which is accumulated in the particulate filter 40 after the last regeneration of the particulate filter 40, is calculated by integrating of the PM increase rate in the whole body of the particulate filter 40. The total PM burning amount, which is a total PM amount burned in the particulate filter 40 after the last regeneration of the particulate filter 40, is calculated by integrating the PM burn rate in the whole body of the particulate filter 40. Then, the second estimate PM accumulation amount is determined by subtracting the total PM burning amount from the total PM accumulation amount.

As shown in FIG. 10, macroscopically the estimated PM amount increases in accordance with an increase of a traveling distance of the vehicle. However, if the front end portion of the particulate filter 40 is clogged, the particulate matters are accumulated concentratedly in the front end portion of the particulate filter 40. Thus, a pressure loss increases partially in the front end portion of the particulate filter 40, so that the pressure loss in the whole body of the particulate filter 40 increases much with respect to the PM inflow amount. Accordingly, when the front end portion of the particulate filter 40 is clogged, the first estimated PM accumulation amount is larger than the second estimated PM accumulation amount.

Thus, when a PM increase amount A1 that is calculated with the first estimated PM accumulation amount, is larger than a predetermined number $\alpha 1$ ($\alpha 1 > 1$) of times of a PM increase amount A2 that is calculated with the second estimated PM accumulation amount, that is, when $A1 \geq A2 \times \alpha 1$, the ECU 70 determines that the front end portion of the particulate filter 40 is clogged. After the ECU 70 determines that the front end portion of the particulate filter 40 is clogged, the process goes to the step S102 in FIG. 5 as in the first embodiment, to perform the front end portion regeneration control.

Third Embodiment

In the second embodiment, the ECU 70 determines that the front end portion of the particulate filter 40 is clogged based on the first estimated PM accumulation amount in the non-regeneration time and the second estimated PM accumulation amount. In the third embodiment, the ECU 70 determines whether the front end portion of the particulate filter 40 is clogged or not based on the first estimated PM accumulation amount in the normal regeneration time and the second estimated PM accumulation amount.

Figure 11:
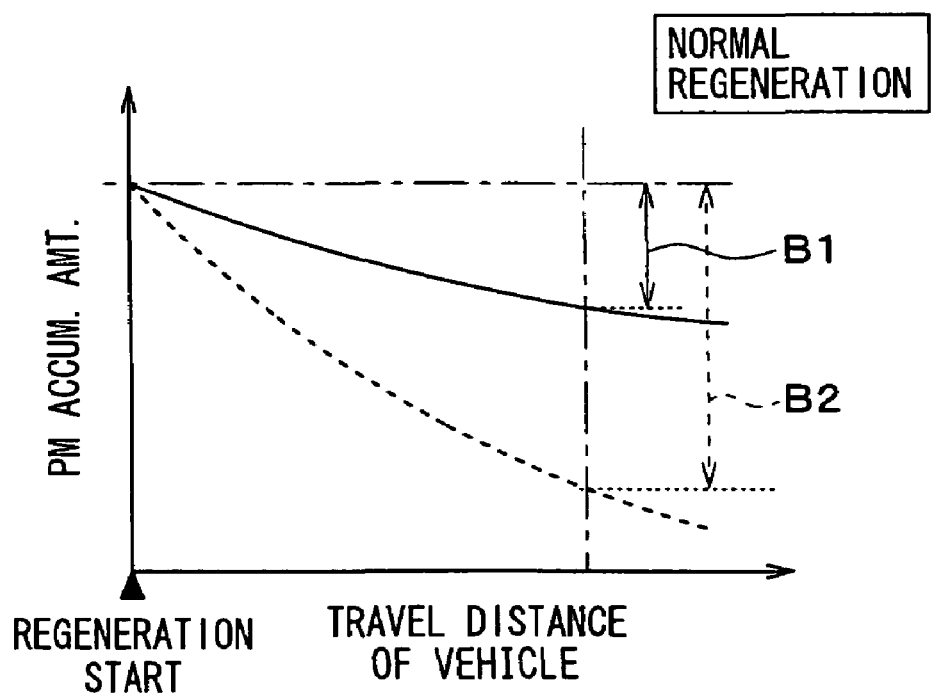
FIG. 11 is a diagram showing an estimated particulate matter decrease amount in a normal regeneration time by an exhaust emission control system according to a third embodiment of the present invention.

FIG. 11 depicts an estimated PM accumulation amount that is accumulated in the particulate filter 40 when the normal generation time is performed. In the drawing, a solid line indicates the first estimated PM accumulation amount, and a broken line indicates the second estimated PM accumulation amount.

In the normal regeneration time of the particulate filter 40, the exhaust gas temperature is relatively low in the front end portion of the particulate filter 40. Thus, even if the particulate matters are clogged in the front end portion of the particulate filter 40, the particulate matters in the front end portion is not smoothly burned, not to resolve the pressure loss due to the particulate matters that are unburned and left in the front end portion of the particulate filter 40.

Thus, when a PM decrease amount B1 that is calculated with the first estimated PM accumulation amount, is smaller than a predetermined number $\alpha 2$ ($\alpha 2 < 1$) of times of a PM decrease amount B2 that is calculated with the second estimated PM accumulation amount, that is, when $B1 \leq B2 \times \alpha 2$, the ECU 70 determines that the front end portion of the particulate filter 40 is clogged. After the ECU 70 determines that the front end portion of the particulate filter 40 is clogged, the process goes to the step S102 in FIG. 5 as in the first embodiment, to perform the front end portion regeneration control.

Modified Embodiments

In each of the above-described embodiments, the exhaust emission control system according to the present invention is applied to the internal combustion engine 1 in which an oxidation catalyst and/or a NOx removal catalyst that causes thermo-reactions with a reducing agent (HC) is not located on an upstream side of the particulate filter 40. The exhaust emission control system according to the present invention may also be applied to internal combustion engines in which the oxidation catalyst and/or the NOx removal catalyst that causes thermo-reactions with the reducing agent (HC) is located on the upstream side of the particulate filter 40.

In the above-described embodiments, the particulate matters clogged in the front end portion of the particulate filter 40 is removed by increasing the number of the post injections in the front end portion regeneration time than the number of the post injections in the normal regeneration time. Alternatively, the particulate matters clogged in the front end portion of the particulate filter 40 can be removed by the following methods (1) to (3). It is also possible to combine the method to increase the number of times of the post injections with the following methods (1) to (3) so as to remove the particulate matters clogged in the front end portion of the particulate filter 40 as demanded.

(1) In the front end portion regeneration time, the EGR bypass valve 54 is controlled to flow the recirculated exhaust gas through the EGR bypass passage 53, that is, to detour the EGR cooler 52 so that the exhaust gas returns to the intake system to be remained in hot temperature. In this manner, by recirculating the hot exhaust gas to the intake system, the intake gas temperature increases, so as to raise the gas temperature in the front end portion of the particulate filter 40 to effectively burn and remove the particulate matters in the front end portion of the particulate filter 40.

When the post injection is performed in the front end portion regeneration time, the intake gas temperature is increased by recirculating the hot exhaust gas to the intake system. Thus, the fuel injected by the post injection can be more securely ignited and combusted in the cylinder.

In this regard, it is desirable to recirculate the hot exhaust gas to the intake system to detour the EGR cooler 52 only in the front end portion regeneration time. This is in view of a thermo-resistance of the EGR valve 51, and to avoid an adhesion of the EGR valve 51 by the HC that is exhausted much by the post injection in the normal regeneration time.

In this method (1), the EGR passage 50, the EGR valve 51, the EGR cooler 52, the EGR bypass passage 53 and the EGR bypass valve 54 forms the exhaust gas recirculator that recirculates the exhaust gas to the intake system, which corresponds to the filter regenerator according to the present invention.

(2) In the front end portion regeneration time, the intake gas amount supplied to the cylinder of the internal combustion engine 1 is decreased than in the normal regeneration time.

Specifically, the intake throttle 22 is shifted to its closure side than in the normal regeneration time, the supercharging pressure of the centrifugal supercharger 13 is decreased than in the normal regeneration time, and/or the EGR valve 51 is shifted to its closure side than in the normal regeneration time.

Accordingly, the thermal capacity of the gas decreases. Thus, it is possible to raise a temperature increase relative to an inputted amount of heat. As a result, it is possible to raise the gas temperature in the front end portion of the particulate filter 40, so as to effectively burn and remove the particulate matters in the front end portion of the particulate filter 40.

This method can cause an output power decrease of the engine 1 especially in a high load time, to cause a malfunction such as an acceleration performance decrease, etc. Accordingly, it is desirable to perform this method only in the front end portion regeneration time.

In this method (2), the intake throttle 22, the centrifugal supercharger 13 and the EGR valve 51 respectively correspond to the filter generator according to the present invention.

(3) In a light load driving time, the fuel injection amount decreases, to make it difficult to increase the gas temperature in the front end portion of the particulate filter 40. Thus, in the front end portion regeneration time, the load of the internal combustion engine 1 is raised to increase the fuel injection amount. Specifically, the rotational speed of the engine 1 at an idle is increased than the rotational speed of the engine 1 in the non-regeneration time. Or, a load of a generator (not shown) that is driven b the internal combustion engine 1 is increased by applying an electric load by using a glow plug (not shown), for example. Accordingly, the fuel injection amount increases, to raise the gas temperature in the front end portion of the particulate filter 40, so as to effectively burn and remove the particulate matters in the front end portion of the particulate filter 40.

However, this method should be performed only in the front end portion regeneration time so that an additional load does not decrease a fuel consumption rate performance.

In this method (3), the ECU 70, the common rail 11 and the fuel injection valve 12 form an engine rotational speed controller to control the rotational speed of the engine 1 to a set rotational speed at an idle. The engine rotational speed controller corresponds to the filter regenerator according to the present invention. The generator corresponds to the filter regenerator according to the present invention.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. An exhaust emission control system for an internal combustion engine comprising:
   a particulate filter that collects particulate matters in an exhaust gas of the internal combustion engine;
   a filter regenerator that regenerates the particulate filter by burning the particulate matters accumulated in the particulate filter;
   a filter front clogging detector that determines whether a front end portion of the particulate filter is clogged by the particulate matters; and
   a filter regeneration controller that controls the filter regenerator to perform a front regeneration to remove the particulate matters accumulated in the front end portion of the particulate filter by raising a temperature of exhaust gas flowing into the particulate filter to be greater than a temperature in a normal regeneration, in response to determination of the filter front clogging detector that the front end portion of the particulate filter is clogged.

2. The exhaust emission control system according to claim 1, wherein the filter front clogging detector calculates a particulate matter accumulation amount in the front end portion of the particulate filter by using a particulate matter increase rate at which the particulate matters is accumulated in the front end portion of the particulate filter, and a particulate matter burn rate at which the particulate matters accumulated in the front end portion of the particulate filter is burned; and determines that the front end portion of the particulate filter is clogged when the particulate matter accumulation amount becomes equal to or larger than a first threshold value.

3. The exhaust emission control system according to claim 2, wherein the filter front clogging detector calculates the particulate matter increase rate by using at least one of a driving state of the internal combustion engine and a variation of a pressure difference between pressures of the exhaust gas on both sides of the particulate filter.

4. The exhaust emission control system according to claim 2, wherein the filter front clogging detector calculates the particulate matter burn rate by using at least one of a temperature of the exhaust gas flowing into the particulate filter and a variation of a pressure difference between pressures of the exhaust gas on both sides of the particulate filter.

5. The exhaust emission control system according to claim 1, wherein the filter front clogging detector calculates a first estimated particulate matter increase amount in a whole portion of the particulate filter by using a variation of a pressure difference between pressures of the exhaust gas on both sides of the particulate filter while the particulate filter is not regenerated by the filter regenerator, and a second estimated particulate matter increase amount in the whole portion of the particulate filter by using at least one of a driving state of the internal combustion engine while the particulate filter is not regenerated by the filter regenerator and an internal temperature of the particulate filter while the particulate filter is not regenerated by the filter regenerator; and determines that the front end portion of the particulate filter is clogged when the first estimated particulate matter increase amount is larger than the second estimated particulate matter increase amount.

6. The exhaust emission control system according to claim 1, wherein:
   the filter regeneration controller controls the filter regenerator to perform a whole regeneration to remove the particulate matters accumulated in the whole portion of the particulate filter when a whole particulate matter accumulation amount in a whole portion of the particulate filter becomes equal to or larger than a threshold value; and
   the filter front clogging detector calculates a first estimated particulate matter decrease amount in a whole portion of the particulate filter by using a variation of a pressure difference between pressures of the exhaust gas on both sides of the particulate filter while the filter regenerator performs the whole regeneration, and a second estimated particulate matter decrease amount in the whole portion of the particulate filter by using at least one of a driving state of the internal combustion engine while the filter regenerator performs the whole regeneration and an internal temperature of the particulate filter while the filter regenerator performs the whole regeneration; and determines that the front end portion of the particulate filter is clogged when the first estimated particulate matter decrease amount is smaller than the second estimated particulate matter decrease amount.

7. The exhaust emission control system according to claim 1, wherein:
- the filter regenerator includes a fuel injection apparatus that injects a fuel into a cylinder of the internal combustion engine; and
- the filter regeneration controller controls the fuel injection apparatus to perform at least one post fuel injection after a main fuel injection to perform a whole regeneration to remove the particulate matters accumulated in the whole portion of the particulate filter when a whole particulate matter accumulation amount in a whole portion of the particulate filter becomes equal to or larger than a threshold value, and controls the fuel injection apparatus to perform the post fuel injections by a greater number of times than in the whole regeneration in performing the front regeneration to remove the particulate matters accumulated in the front end portion of the particulate filter when the filter front clogging detector determines that the front end portion of the particulate filter is clogged.

8. The exhaust emission control system according to claim 1, wherein:
- the filter regenerator includes an exhaust gas recirculation apparatus that recirculates at least a part of the exhaust gas to an intake system of the internal combustion engine, the exhaust gas recirculation apparatus having an EGR cooler to cool the exhaust gas recirculated to the intake system and a EGR cooler bypass passage that recirculates the exhaust gas to the intake system to detour the EGR cooler; and
- the filter regeneration controller controls the exhaust gas recirculation apparatus to recirculate the exhaust gas to the intake system to detour the EGR cooler when the filter front clogging detector determines that the front end portion of the particulate filter is clogged.

9. The exhaust emission control system according to claim 1, wherein:
- the filter regeneration controller controls the filter regenerator to perform a whole regeneration to remove the particulate matters accumulated in the whole portion of the particulate filter when a whole particulate matter accumulation amount in a whole portion of the particulate filter becomes equal to or larger than a threshold value;
- the filter regenerator includes at least one of an intake throttle that opens and closes an intake passage of the internal combustion engine, a supercharger that pressurizes an intake gas supplied to the internal combustion engine to a supercharging pressure and an EGR valve that opens and closes an EGR passage to recirculate the exhaust gas to an intake system of the internal combustion engine; and
- the filter regeneration controller performs at least one of a control to shift an opening angle of the intake throttle toward its closure side than during the whole regeneration, a control to decrease the supercharging pressure of the supercharger than during the whole regeneration, and a control to shift an opening angle of the EGR valve toward its closure side than during the whole regeneration, when the filter front clogging detector determines that the front end portion of the particulate filter is clogged.

10. The exhaust emission control system according to claim 1, wherein:
- the filter regenerator includes at least one of an engine rotational speed controller that controls an rotational speed of the internal combustion engine at an idle to a predetermined idling rotational speed, and a generator that generates an electric power by being driven by the internal combustion engine; and
- the filter regeneration controller performs at least one of a control to increase the idling rotational speed, and a control to increase a production of the electric power by the generator, when the filter front clogging detector determines that the front end portion of the particulate filter is clogged.

11. The exhaust emission control system according to claim 1, wherein the filter regeneration controller controls the filter regenerator to perform the front regeneration to remove the particulate matters by raising the temperature of exhaust gas in a front end portion of the particulate filter in response to the determination.

12. The exhaust emission control system according to claim 1, wherein:
- the filter regenerator includes a fuel injection apparatus that injects a fuel into a cylinder of the internal combustion engine;
- in the normal regeneration, the filter regeneration controller controls the fuel injection apparatus to perform a main fuel injection and then at least one post fuel injection;
- in the front regeneration, the filter regeneration controller controls the fuel injection apparatus to perform a main fuel injection and then post fuel injections, the number of post fuel injections performed in the front regeneration being greater than the number of the at least one post fuel injection performed in the normal regeneration.

13. An exhaust emission control system for an internal combustion engine comprising:
- a particulate filter that collects particulate matters in an exhaust gas of the internal combustion engine;
- a filter regenerator that regenerates the particulate filter by burning the particulate matters accumulated in the particulate filter;
- a filter front clogging detector that determines whether a front end portion of the particulate filter is clogged by the particulate matters; and
- a filter regeneration controller that controls the filter regenerator to perform a front regeneration to remove the particulate matters accumulated in the front end portion of the particulate filter in response to determination of the filter front clogging detector that the front end portion of the particulate filter is clogged,
- wherein the filter regenerator includes a fuel injection apparatus that injects a fuel into a cylinder of the internal combustion engine; and
- the filter regeneration controller controls the fuel injection apparatus to perform at least one post fuel injection after a main fuel injection to perform a whole regeneration to remove the particulate matters accumulated in the whole portion of the particulate filter when a whole particulate matter accumulation amount in a whole portion of the particulate filter becomes equal to or larger than a threshold value, and controls the fuel injection apparatus to perform the post fuel injections by a greater number of times in one exhaust stroke than in the whole regeneration in performing the front regeneration to remove the particulate matters accumulated in the front end portion of the particulate filter when the filter front clogging detector determines that the front end portion of the particulate filter is clogged.

* * * * *